US006018986A

United States Patent [19]

Ottosson et al.

[11] Patent Number: 6,018,986

[45] Date of Patent: Feb. 1, 2000

[54] METHOD FOR CARRYING OUT AN IONIC CURRENT MEASUREMENT IN A COMBUSTION ENGINE USING A LEAN FUEL MIXTURE

[75] Inventors: Lars-Olof Ottosson, Amal; Jörgen Bengtsson, Svanskan, both of Sweden

[73] Assignee: Sem AB, Amal, Sweden

[21] Appl. No.: 08/930,851

[22] PCT Filed: Mar. 28, 1996

[86] PCT No.: PCT/SE96/00406

§ 371 Date: Oct. 3, 1997

§ 102(e) Date: Oct. 3, 1997

[87] PCT Pub. No.: WO96/31695

PCT Pub. Date: Oct. 10, 1996

[30] Foreign Application Priority Data

Apr. 5, 1995 [SE] Sweden .................................. 9501260

[51] Int. Cl.[7] .................................................... G01M 15/00

[52] U.S. Cl. ........................................... 73/35.08; 324/399

[58] Field of Search ................................ 73/35.08, 35.01, 73/35.07, 112, 116, 117.2, 117.3; 324/393, 399

[56] References Cited

U.S. PATENT DOCUMENTS

| | | | |
|---|---|---|---|
| 4,491,110 | 1/1985 | Bone et al. | 73/35.08 |
| 4,653,459 | 3/1987 | Herden . | |
| 5,424,647 | 6/1995 | Ohsawa et al. | 73/35.08 |
| 5,452,603 | 9/1995 | Asano et al. | 73/116 |
| 5,747,670 | 5/1998 | Takahashi et al. | 73/35.08 |
| 5,769,049 | 6/1998 | Nytomt et al. | 73/116 |
| 5,777,216 | 7/1998 | Van Duyne et al. | 73/35.08 |
| 5,778,855 | 7/1998 | Czekala et al. | 123/416 |
| 5,785,020 | 7/1998 | Takahashi et al. | 73/35.08 |

FOREIGN PATENT DOCUMENTS 0 615 067 A2 9/1994 European Pat. Off. .

*Primary Examiner*—Eric S. McCall
*Attorney, Agent, or Firm*—Ware, Fressola, Van der Sluys & Adolphson LLP

[57] ABSTRACT

A method of carrying out ionic current measurement in an internal combustion engine, using a lean fuel mixture which requires an increased burning duration, comprises the steps of (a) generating an ignition spark, (b) detecting initiation of combustion of the lean fuel mixture by the ignition spark, (c) cutting off the ignition spark within 20 microseconds after the initiation of combustion and (d) thereafter performing the ionic current measurement. The combustion start can be detected by measuring the change in the burning potential and/or the burning current, detected at the low-tension side of the secondary coil of the ignition system, using leak capacitances of the ignition coil, or by using a separate winding of the ignition coil. The ignition spark is cut off by a controllable ignition magneto.

18 Claims, No Drawings

METHOD FOR CARRYING OUT AN IONIC CURRENT MEASUREMENT IN A COMBUSTION ENGINE USING A LEAN FUEL MIXTURE

TECHNICAL FIELD

The present invention relates to a method for carrying out an ionic current measurement in an internal combustion engine using a lean fuel mixture and, owing to that, requiring an increased burning duration for the ignition spark.

PRIOR ART

At present, the motor car industry is working on the object to use as lean fuel mixtures as possible, by that means decreasing noxious outlets of exhausts. (By the expression lean fuel mixtures is meant fuel mixtures with an increased air supply.) This requires a high quality of the ignition sparks in the ignition plugs. The lean fuel mixtures require an increased burning duration of the ignition spark involving an increased ignition plug wear. The wear becomes so great that the ignition plugs must be replaced at short intervals which is inconvenient and leads to increased costs. The increased burning duration has the further result that conventional ionic current measurement cannot be used.

Our SE-A-9501259-7 indicates a method and a device for increasing the burning duration of an ignition spark with a minimum of ignition plug wear in an ignition system for an internal combustion engine by initially supplying a short high tension pulse to give a short high-energy ignition spark, which spark then can be extended by supplying a potential having a lower level.

For being able to optimize the proportion fuel/air in the mixture in the device mentioned above, in relation to an increased burning duration for the ignition spark and a minimum of the wear of the ignition plug, and also for the measurement of other combustion related characteristics, the ionic current in the combustion chamber is measured.

One problem in that connection is that the ionic current measurement cannot be carried out during the period when a spark is oscillating in the spark gap. An ignition system according to what is indicated above, usually has an oscillating spark, i.e. the spark is obtained by an alternating current. The fact is that a ‘direct current spark’ only includes half the energy compared with a corresponding ‘alternating current spark’.

There is the following explanation to the fact that an ionic current measurement cannot be carried out in the course of a spark oscillating in the spark gap. Since a spark current has the magnitude of 0.5 A and the ionic current about 0.01 mA, the spark current is about 50 000 times greater than the ionic current. A small extension of the burning duration of the spark current involves that 1/50 000 of the decaying spark current still can exist when the ionic current signal is initiated, i.e. the magnitude of the remaining spark current affects the ionic current.

At a motor speed of 6000 r.p.m., 200 $\mu$s is equivalent to about 7°. This short extension of the spark current is required for lean fuel mixtures. The spark current decays but a current of at least the magnitude of the ionic current is left during about 30° having an influence on the said ionic current. In real difficult conditions, i.e. with lean fuel mixtures, and in order to decrease the emissions of exhausts, a burning duration of 1–2 ms is required, during which period the ionic current “is drowned” by the spark current, especially at high speed. Accordingly, a measurement of the ionic current cannot be carried out until the ignition spark is cut off.

SUMMARY OF THE INVENTION AND ITS ADVANTAGES

The invention solves the object to carry out the ionic current measurement in an internal combustion engine using such a lean fuel mixture as possible and by that means an increased burning duration of the ignition spark. The invention is characterized in that the start of the combustion of the fuel mixture is detected, after which the ignition spark generating the combustion is cut off, after which the measurement of the ionic current can be done.

DESCRIPTION OF AN EMBODIMENT

An ionic current measurement is used for detecting if a motor ‘is knocking’, which fuel/air mixture that exists, if the combustion does not occur and other characteristics which are important for the motor and the emissions.

As indicated above, in certain circumstances, an internal combustion engine requires sparks with a long burning duration in order to initiate the combustion in a safe way. A long burning duration causes the ionic current measurement according to known techniques not to work and besides the wear of the ignition plug is serious.

One method to solve the problem of measuring ionic current in fuel mixtures, which are difficult to ignite and which require a long burning duration, is to detect the start of the combustion after which the generated ignition spark is cut off, such that the ionic current measurement can be carried out. It is possible to cut off a spark according to what is indicated in our patent application SE-A-9501259-7 indicated above, viz. by a controllable ignition generator which can be cut off within 20 $\mu$s.

A spark-over occurs when the potential across the spark gap is 10–50 kV, i.e. this potential is required for a spark-over to take place. The magnitude of the spark-over potential-is influenced by the pressure, temperature and gas composition in the combustion chamber and by the design of the electrodes.

The spark-over potential can be measured by means of any of the leak capacitances existing in the high tension generator (ignition coil), for example the primary coil, possibly the shields, the iron core, parts of the secondary coil or else by means of a separate winding for the purpose (coil).

The spark generated is made of plasma, i.e. heated gas including ions and electrons and being a good electric conductor. The time point for the spark-over is the time when the spark is initiated. It is determined by the spark-over potential, as this potential is decreasing strongly when a spark-over happens in the ignition plug.

The start of the combustion occurs a certain period after the arrival of a spark-over. This period varies dependent on many reasons, for example the temperature, pressure and fuel/air mixture in the combustion chamber.

The start of the combustion is detected by means of the measurement of a change of the burning potential and/or the burning current, the burning potential/burning current being that potential/current required for maintaining a spark in the spark gap, i.e. after a spark-over has occurred. The burning potential is in general about 300–1000 V and the burning current about 20–1000 mA.

The burning current can be measured on the low tension side of the secondary coil and the burning potential is a function of the burning current. The burning potential is affected by the extension of the plasma, which changes stepwise at the start of the combustion. If it is detected how the burning current or the burning potential is changed after a spark-over has occurred, it can be determined when the combustion has started and then cut off the spark, which is possible by means of a controllable spark generator according to the patent application mentioned above.

Likewise, a failed combustion start (misfire) is detected by means of a measurement of a failed change of the burning potential and/or burning current. For example, the amount of failed combustion starts being allowed in USA is regulated by the authorities. The reason for this is that not burned hydrocarbons will destroy the catalytic converter and in that way, on a long view, the exhaust gas filter system of the car will be out of order.

The burning potential or the burning current is detected on the low tension side of the secondary coil of the ignition system by means of any of the leak capacitances existing in the ignition coil of the ignition system, or by means of a separate winding arranged for this purpose of the ignition coil of the ignition system.

Thus, the method according to the invention has the advantage, in relation to previous known techniques, that the ionic current measurement can be carried out in an internal combustion engine that uses a lean fuel mixture resulting in an increased burning duration, the wear of the ignition plug not being unnecessary severe.

What is claim is:

1. In a method for carrying out an ionic current measurement in an internal combustion engine using a lean fuel mixture and having an ignition system, the method comprising the steps of:

(a) generating an ignition spark;

(b) detecting initiation of combustion of the lean fuel mixture by the ignition spark;

(c) cutting off the ignition spark within 20 microseconds of the initiation of combustion; and (d) performing the ionic current measurement.

2. A method according to claim 1, wherein the initiation of the combustion is detected by measuring change of burning potential.

3. A method according to claim 2, wherein the burning potential is detected at a low tension side of a secondary coil in the ignition system.

4. A method according to claim 3, wherein the burning potential is detected by means of any leak capacitances being found in an ignition coil of the ignition system.

5. A method according to claim 2, wherein the burning potential is detected by means of a separate winding arranged in an ignition coil of the ignition system.

6. A method according to claim 1, wherein the initiation of the combustion is detected by measuring change of burning current.

7. A method according to claim 6, wherein the burning current is detected at a low tension side of a secondary coil in the ignition system.

8. A method according to claim 7, wherein the burning current is detected by means of any leak capacitances being found in an ignition coil of the ignition system.

9. A method according to claim 7, wherein the burning current is detected by means of a separate winding arranged in an ignition coil of the ignition system.

10. A method according to claim 1, wherein the failure of the initiation of combustion is detected by a measurement of an unchanged burning potential.

11. A method according to claim 10, wherein the unchanged burning potential is detected at a low tension side of a secondary coil in the ignition system.

12. A method according to claim 10, wherein the unchanged burning potential is detected by means of any leak capacitances being found in an ignition coil of the ignition system.

13. A method according to claim 11, wherein the unchanged burning potential is detected by means of a separate winding arranged in an ignition coil of the ignition system.

14. A method according to claim 1, wherein the failure of the initiation of combustion is detected by a measurement of unchanged burning current.

15. A method according to claim 14, wherein the unchanged burning current is detected at a low tension side of a secondary coil in the ignition system.

16. A method according to claim 15, wherein the unchanged burning current is detected by means of any leak capacitances being found in an ignition coil of the ignition system.

17. A method according to claim 15, wherein the unchanged burning current is detected by means of a separate winding arranged in an ignition coil of the ignition system.

18. A method according to claim 1, wherein the ignition spark is cut off by a controllable ignition magneto.

* * * * *

UNITED STATES PATENT AND TRADEMARK OFFICE

CERTIFICATE OF CORRECTION

PATENT NO. : 6,018,986

DATED : February 1, 2000

INVENTOR(S) : Lars-Olof Ottosson, et al.

It is certified that error appears in the above-identified patent and that said Letters Patent is hereby corrected as shown below:

On the title page, item [75]: "Inventors", "Svanskan" should be --Svanskog--.

In column 2, line 36, "-" should be deleted.

Signed and Sealed this

Twenty-first Day of November, 2000

Attest:

Q. TODD DICKINSON

*Attesting Officer* *Director of Patents and Trademarks*